(12) United States Patent
Hu et al.

(10) Patent No.: US 9,838,885 B2
(45) Date of Patent: Dec. 5, 2017

(54) WIRELESS COMMUNICATION SYSTEM AND METHOD AND EXPANSION UNIT OF FLAT NETWORK ARCHITECTURE

(71) Applicant: COMBA TELECOM SYSTEMS (CHINA) LTD., Guangdong (CN)

(72) Inventors: Yingtian Hu, Guangdong (CN); Jinqing Zhou, Guangdong (CN); Yuanjian Zhang, Guangdong (CN); Shiqun Deng, Guangdong (CN); Yuejun Zhang, Guangdong (CN)

(73) Assignee: COMBA TELECOM SYSTEMS (CHINA) LTD., Guangzhou (CN)

( * ) Notice: Subject to any disclaimer, the term of this patent is extended or adjusted under 35 U.S.C. 154(b) by 200 days.

(21) Appl. No.: 14/370,697

(22) PCT Filed: Nov. 2, 2012

(86) PCT No.: PCT/CN2012/084028
§ 371 (c)(1),
(2) Date: Jul. 3, 2014

(87) PCT Pub. No.: WO2013/102368
PCT Pub. Date: Jul. 11, 2013

(65) Prior Publication Data
US 2014/0362763 A1 Dec. 11, 2014

(30) Foreign Application Priority Data
Jan. 6, 2012 (CN) .......................... 2012 1 0005096

(51) Int. Cl.
*H04W 16/26* (2009.01)
*H04W 88/08* (2009.01)
*H04B 10/2575* (2013.01)

(52) U.S. Cl.
CPC ......... *H04W 16/26* (2013.01); *H04W 88/085* (2013.01); *H04B 10/25752* (2013.01)

(58) Field of Classification Search
CPC ............ H04B 10/25752; H04W 16/26; H04W 88/085; H04L 5/0001; H04L 12/2838
(Continued)

(56) References Cited

U.S. PATENT DOCUMENTS 7,200,391 B2 * 4/2007 Chung ................ H04W 88/085
455/423
8,406,178 B2 * 3/2013 Tan ................... H04B 10/25759
370/328
(Continued)

FOREIGN PATENT DOCUMENTS

CN 101394658 3/2009
CN 101442756 5/2009
(Continued)

*Primary Examiner* — Jeffrey M Rutkowski
*Assistant Examiner* — Shah Rahman

(57) ABSTRACT

Disclosed are a wireless communication system and method and an expansion unit of a flat network architecture. The wireless communication system comprises at least one baseband signal source, an expansion unit (EU) and at least one remote radio unit (RU) connected to the EU. By overlapping the baseband signals output by each baseband signal source, remote transmission and wireless coverage of multimode digital signals are achieved, thereby solving the problem of system performance degradation caused by the interaction of radio-frequency analog signal transmission and optical transmission in the prior art.

13 Claims, 9 Drawing Sheets

(58) Field of Classification Search
USPC .................................................. 370/315, 916
See application file for complete search history.

(56) References Cited

U.S. PATENT DOCUMENTS

| | | | | |
|---|---|---|---|---|
| 2002/0080448 | A1* | 6/2002 | Kim .................. | H04B 10/25753 398/115 |
| 2003/0053165 | A1* | 3/2003 | Nagayama ........... | H04B 10/077 398/5 |
| 2004/0076127 | A1* | 4/2004 | Porte ........................ | H04L 45/34 370/328 |
| 2005/0007993 | A1* | 1/2005 | Chambers ................ | H04L 12/66 370/349 |
| 2005/0208976 | A1* | 9/2005 | Funakubo .............. | H04W 88/08 455/562.1 |
| 2008/0317464 | A1* | 12/2008 | Li ......................... | H04W 88/08 398/43 |
| 2010/0157949 | A1* | 6/2010 | Kanda .................... | H01Q 1/246 370/332 |
| 2010/0296816 | A1* | 11/2010 | Larsen ............. | H04B 10/25754 398/116 |
| 2011/0268452 | A1* | 11/2011 | Beamon ................ | G02B 6/0288 398/117 |
| 2012/0275363 | A1* | 11/2012 | Hu .................... | H04W 52/0206 370/311 |
| 2013/0077966 | A1* | 3/2013 | Gelbman ............ | H04W 88/085 398/43 |
| 2013/0089037 | A1* | 4/2013 | Negus .................. | H04B 7/0691 370/329 |
| 2013/0095875 | A1* | 4/2013 | Reuven .................... | H04B 7/10 455/509 |
| 2013/0128760 | A1* | 5/2013 | Fujishima .............. | H04B 7/022 370/252 |
| 2013/0150063 | A1* | 6/2013 | Berlin .............. | H04B 10/25758 455/450 |
| 2013/0170353 | A1* | 7/2013 | Liu .................... | H04W 28/0289 370/235 |
| 2014/0226736 | A1* | 8/2014 | Niu ..................... | H04L 27/2628 375/260 |

FOREIGN PATENT DOCUMENTS

| | | | |
|---|---|---|---|
| CN | 101741470 | 6/2010 | |
| CN | 102547716 | 7/2012 | |
| CN | 102547778 | 7/2012 | |
| WO | WO 2011110071 A1 * | 9/2011 | ........ H04W 28/0289 |

* cited by examiner

--Prior Art--

--Prior Art--

--Prior Art--

WIRELESS COMMUNICATION SYSTEM AND METHOD AND EXPANSION UNIT OF FLAT NETWORK ARCHITECTURE

CROSS-REFERENCE TO RELATED APPLICATIONS

This application is a US National Stage of International Application No. PCT/CN2012/084028, filed on 2 Nov. 2012, designating the United States, and claiming priority from Chinese Patent Application No. 201210005096.1, filed with the Chinese Patent Office on Jan. 6, 2012 and entitled "Wireless communication system and method and expansion unit of flat network architecture", which is hereby incorporated by reference in its entirety.

FIELD OF THE INVENTION

The present invention relates to the field of wireless communication technologies and particularly to a wireless communication system and method and an expansion unit of a flat network architecture.

BACKGROUND OF THE INVENTION

At present, in the field of wireless communication technologies, e.g., the $2^{nd}$ Generation (2G) and the $3^{rd}$ Generation (3G) of mobile communication technologies, a wireless communication system is deployed typically with a macro base station and also a supplementary indoor Distributed Antenna System (DAS) and repeaters to implement the coverage by radio signals. For example, a Global System for Mobile Communications (GSM) achieves its radio coverage typically with Base Station Controllers (BSCs) and Base Transceiver Stations (BTSs); while the radio coverage is achieved typically with Base Band Units (BBUs) and Radio Remote Units (RRUs) in the 3G field.

There are generally the following three structures of a currently common DAS system:

As shown in FIG. 1, there is a schematic structural diagram of a first DAS system based upon BSCs, BTSs and an RF conditioning. The system is an analogue radio remote system, and in the system shown in FIG. 1, a plurality of BTSs output RF analogue signals and input the RF analogue signals into a DAS head end over optic fiber links. The input RF analogue signals at different carrier frequencies are combined, allocated, coupled and superimposed by the RF conditioning and converted by electro-optical converters into multiple RF coupled optical signals, which are finally output through remote antennas. In this case, signals output over the remote antennas can result from coupling and superimposition of any one or more of the signals output by the BTSs, that is, multimode signals are output.

In the DAS system shown in FIG. 1, since the analogue signals are transmitted over the optical fibers, and the analogue radio frequency signal transmission and the optical signal transmission may interfere with each other, the degradation of the system performance is caused; and also since the larger the optical fiber length is, the higher a noise coefficient of the system will be, the remote distance of the RF remote ends is limited in order to guarantee the system performance.

As shown in FIG. 2, there is a schematic structural diagram of a second DAS system based upon BSCs, a BBU and remote RF modules. In this system, the multiple BSCs and a packet switched network output digital baseband signals directly to the BBU over digital baseband links; the BBU routes and allocates the digital baseband signals, and outputs the routed digital baseband signals to the remote RF modules over digital optical links; and the remote RF modules modulate the digital baseband signals onto corresponding carrier frequencies and then output them through remote radio frequency ends. In this system, the digital baseband signals are transmitted over the optical fibers, thus lowering mutual interference between signal transmission and optical transmission and guaranteeing the system performance. However the BBU can only route the input digital baseband signals simply without any superimposition of those signals, so signals output by the remote radio frequency ends are merely single-mode signals.

As shown in FIG. 3, there is a schematic structural diagram of a third DAS system based upon BTSs, BBUs, low power-consumption RF modules and remote RF modules. This system is also an analogue radio frequency remote system in a similar architecture to the first DAS system, where the BTSs output RF analogue signals at different carrier frequencies, and the RF analogue signals are coupled and superimposed by an RF conditioning and converted by electro-optical converters into multiple RF coupled optical signals which are finally output through remote antennas, to thereby implement the coverage by multimode signals. At the same time, in order to support coupling and superimposition of baseband signals of the BBUs, the multiple low power-consumption RF modules are added to the system. The RF modules modulate the baseband signals output by the BBUs onto corresponding RF carriers, and the RF conditioning performs RF coupling and superimposition on the RF carriers to obtain multiple RF coupled optical signals, so that signals output over the multiple remote antennas can result from coupling and superimposition of any one or more of the signals of the BTSs and the BBUs, to thereby implement the coverage by multimode signals.

The third DAS system also suffers from the same problem of the system performance as the first DAS system, and moreover, the baseband signal superimposition technology is adopted in the third DAS system, but it is performed by up-converting and then RF-coupling the baseband signals, and consequently it is necessary to deploy the multiple RF modules in the system, thus making it difficult and costly to deploy the system.

Also, since the remote antennas can be installed only at a site where optical fiber lines are deployed, the existing DAS system has to be installed with a large-capacity backhaul network of optical fibers or the like, thus making it difficult to deploy the network, and moreover, the existing DAS system usually has to be extended in capacity by adding a full set of equipments including a BTS, a BSC, an MSC, etc., thus making it difficult and costly to extend the capacity.

SUMMARY OF THE INVENTION

The invention provides a wireless communication system and an expansion unit of a flat network architecture so as to address the problem in the prior art of the system performance degradation due to mutual interference between analogue radio frequency signal transmission and optical transmission.

A wireless communication system of a flat network architecture includes at least one baseband signal source, an Expansion Unit (EU) and at least one Radio Remote Unit (RU) connected with the EU, wherein:

the baseband signal source is configured to convert downlink data transmitted by a radio service provider network into a downlink baseband high-rate signal and then transmit the downlink baseband high-rate signal to the EU, and to convert an uplink baseband high-rate signal transmitted by the EU into uplink data and then transmit the uplink data to the radio service provider network;

the EU is configured to decompose the downlink baseband high-rate signal transmitted by the baseband signal source into multiple downlink sub-baseband high-rate signals and convert the downlink sub-baseband high-rate signals into downlink sub-baseband low-rate signals and then transmit the downlink sub-baseband low-rate signals to the RU, and to converge and convert uplink sub-baseband low-rate signals transmitted by the RU into the uplink baseband high-rate signal and then transmit the uplink baseband high-rate signal to the baseband signal source; and the RU is configured to up-convert the downlink sub-baseband low-rate signals transmitted by the EU into remote downlink radio frequency signals and transmit the remote downlink radio frequency signals to a user equipment, and to down-convert remote uplink radio frequency signals transmitted by the user equipment into the uplink sub-baseband low-rate signals and then transmit the uplink sub-baseband low-rate signals to the EU.

An EU includes:

a baseband processing unit configured to decompose a received downlink baseband high-rate signal into multiple downlink sub-baseband high-rate signals and transmit the multiple downlink sub-baseband high-rate signals to an output conversion unit, and to converge received uplink sub-baseband low-rate signals into an uplink baseband low-rate signal and then transmit the uplink baseband low-rate signal to the output conversion unit; and the output conversion unit configured to convert the downlink sub-baseband high-rate signals transmitted by the baseband processing unit into downlink sub-baseband low-rate signals and then output the downlink sub-baseband low-rate signals, and to convert the uplink baseband low-rate signal transmitted by the baseband processing unit into an uplink baseband high-rate signal and then output the uplink baseband high-rate signal.

A baseband signal source includes a reception unit, a conversion unit and a transmission unit, wherein:

the reception unit is configured to receive downlink data and to receive an uplink baseband high-rate signal;

the conversion unit is configured to convert the downlink data received by the reception unit into a downlink baseband high-rate signal and to convert the uplink baseband high-rate signal received by the reception unit into uplink data; and the transmission unit is configured to transmit the downlink baseband high-rate signal and the uplink data obtained by the conversion unit through conversion.

Advantageous effects of the invention are as follows:

Embodiments of the invention provide a wireless communication system and an expansion unit of a flat network architecture. The wireless communication system includes at least one baseband signal source, an EU and at least one RU connected with the EU, where baseband signals output by the respective baseband signal sources are superimposed by the EU to thereby achieve remote transmission and radio coverage of multimode digital signals, so as to address the problem in the prior art of the system performance degradation due to mutual interference between analogue radio frequency signal transmission and optical transmission.

DETAILED DESCRIPTION OF THE INVENTION

Embodiments of the invention provide a wireless communication system and method and an expansion unit of a flat network architecture. The wireless communication system performs baseband superimposition on baseband signals output by respective baseband signal sources to thereby achieve digital remote transmission of multimode signals, so that an RF signal and an optical signal are kept independent from each other and do not interfere with each other in the optical fiber transmission process, and also since the digital signal is not be attenuated as the optical signal is attenuated, its dynamic range can be kept unchanged in the long-distance and multi-channel shunt transmission system to thereby guarantee the system performance. Moreover, the EU and the RU in the wireless communication system can be connected by Category-5 lines and other low-rate transmission links to thereby lower the difficulty in system deployment, and the baseband signal sources can be cascaded or stacked for networking to thereby facilitate the extension of the system capacity.

The embodiments of the invention will be further described below with reference to the drawings, but the invention will not be limited to the following embodiments.

First Embodiment

Figure 1:
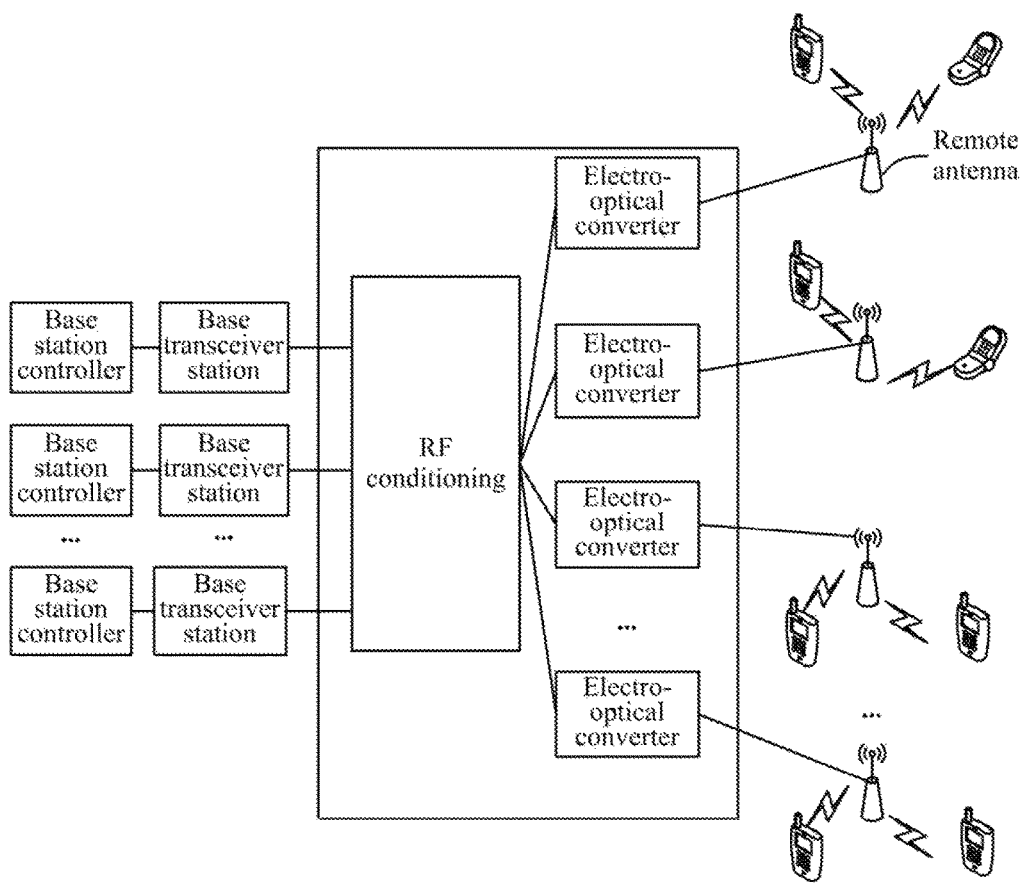
FIG. 1 is a schematic structural diagram of a DAS system based upon BSCs, BTSs and an RF conditioning.
Figure 2:
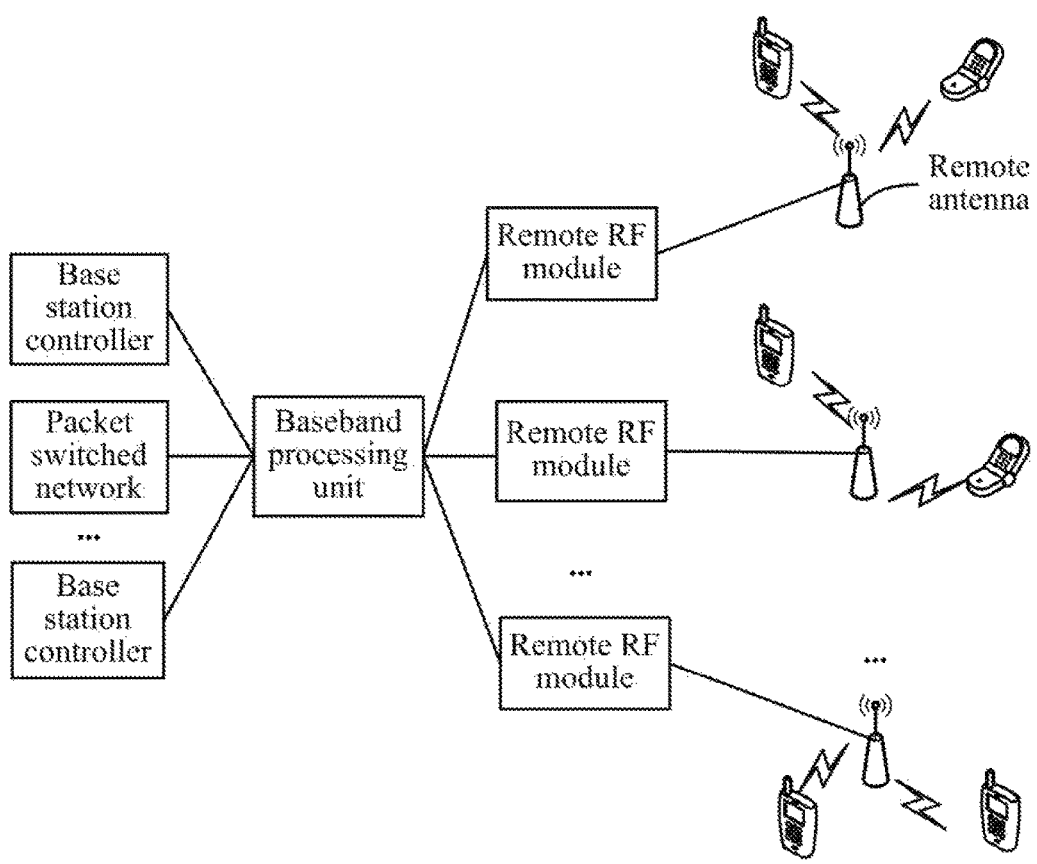
FIG. 2 is a schematic structural diagram of a DAS system based upon BSCs, a BBU and remote RF modules.
Figure 3:
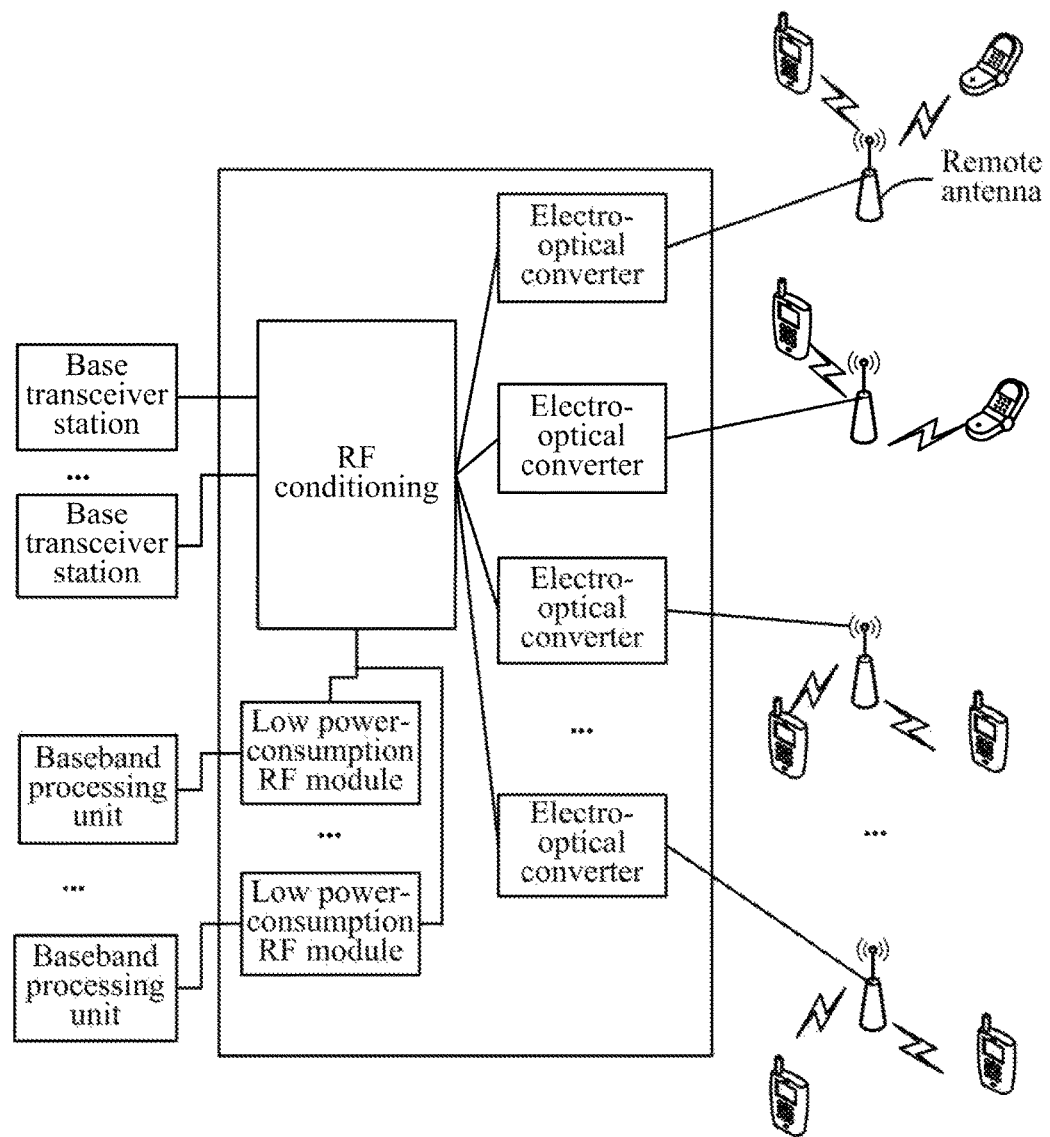
FIG. 3 is a schematic structural diagram of a DAS system based upon BTSs, BBUs, low power-consumption RF modules and remote RF modules.
Figure 4:
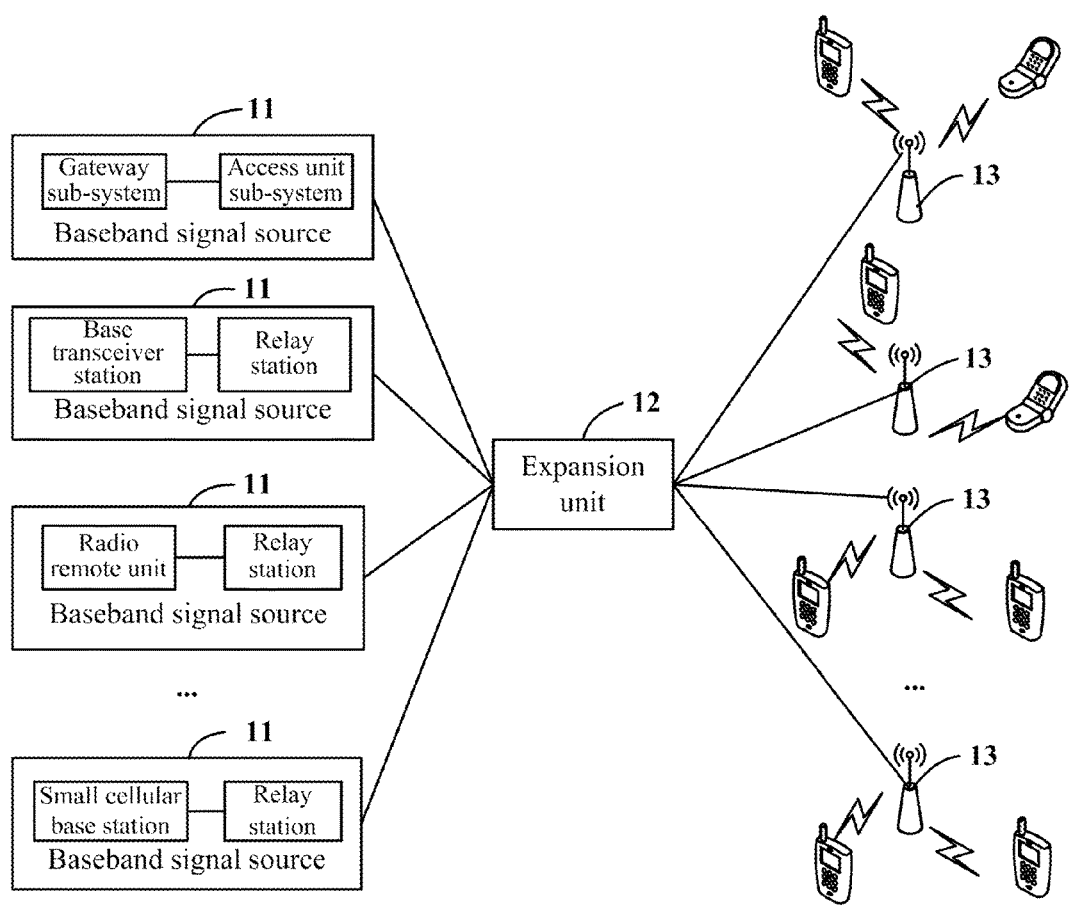
FIG. 4 is a schematic structural diagram of a wireless communication system according to a first embodiment of the invention.

As shown in FIG. 4, there is a schematic structural diagram of a wireless communication system of a flat network architecture according to the first embodiment of the invention, where the wireless communication system includes at least one baseband signal source 11, an EU 12 and at least one RU 13 connected with the EU 12.

The wireless communication system can support multiple wireless transmission modes including a Global System of Mobile communication (GSM), Wideband Code Division Multiple Access (WCDMA), Time Division-Synchronous Code Division Multiple Access (TD-SCDMA), Long Term Evolution (LTE), a Wireless Local Area Network (WLAN) and the like.

The wireless communication system can support the signal processing in any one of the above modes or can concurrently support the hybrid processing of multiple signals in more than one of the above modes, that is, the wireless communication system can support the processing of single-mode or multimode signals.

The baseband signal source 11 is configured to convert downlink data transmitted by a radio service provider network into a downlink baseband high-rate signal and then transmit the downlink baseband high-rate signal to the EU 12, and to convert an uplink baseband high-rate signal transmitted by the EU 12 into uplink data and then transmit the uplink data to the radio service provider network. Particularly the baseband signal source 11 accesses the radio service provider network (e.g., a core network) via a communication link, obtains the downlink data from the radio service provider network and performs baseband processing on the downlink data, and then outputs the downlink baseband high-rate signal encapsulated in the frame form to the EU 12, and receives the uplink baseband high-rate signal encapsulated in the frame form from the EU 12, performs baseband processing on the uplink baseband high-rate signal and then converts it into uplink data and returns the uplink data to the radio service provider network.

The baseband signal source 11 includes one or more of the following baseband signal sources:

A baseband signal source including a Gateway (GW) sub-system and an Access Unit (AU) sub-system, a baseband signal source including a BTS and a relay station, a baseband signal source including a small cellular base station (a femto base station) and a relay station, a baseband signal source including an RRU and a relay station, and another baseband signal source capable of outputting a baseband signal and the like.

Taking a baseband signal source including a GW subsystem and an AU sub-system as an example, the operating principle of the baseband signal source is as follows:

The AU sub-system is configured to convert GW downlink data (including the signaling plane and the user plane) transmitted by the GW sub-system into a downlink baseband high-rate signal and transmit it to the EU 12, and to convert an uplink baseband high-rate signal transmitted by the EU 12 into GW uplink data and transmit it to a core network through the GW sub-system.

Particularly, the AU sub-system includes a BBU and an upper control unit and is equivalent to being integrated with a part of functions of an RNC (Radio Network Controller) and a NodeB or a part of functions of a BSC and a BTS, where the BBU includes encoding and decoding, modulation and demodulation, interleaving and de-interleaving, encryption and decryption, frequency-hopping, timing control, framing and de-framing and other functions, and is generally configured to perform baseband processing on the received GW downlink data to obtain the downlink baseband high-rate signal and to convert the received uplink baseband high-rate signal into the GW uplink data; and the upper control unit includes radio resource management, mobility management, Media Access Control (MAC), Radio Link Control (RLC) and other functions. Also the AU sub-system further has an Iuh interface function, local and remote operation and maintenance functions, functions of monitoring the operating status of the AU sub-system and reporting alarm information and other functions.

The GW sub-system is located between the AU sub-system and the core network, connected with the AU sub-system through a gateway interface (e.g., an Iuh interface which is an interface between the gateway and the AU), and configured to converge and forward signaling and data between the AU sub-system and the core network. The GW sub-system accesses the core network via a standard communication interface after converging the signaling and the data, for example, the GW sub-system can access a packet domain of a CN via a standard communication interface (e.g., an Iu-PS of the 3GPP) and access a circuit domain of the CN via a standard communication interface (e.g., an Iu-CS of the 3GPP).

Furthermore, the GW sub-system further includes a part of the functions of the RNC, including functions of supporting mobility switching of user-plane data of a user equipment, of buffering downlink packet data in an idle mode and of supporting paging and other functions; and the GW sub-system further includes processing functions of a security gateway, including functions of supporting establishment and management of an Internet Protocol Security (IPSec) channel, and of providing secured and reliable communication transmission and access authentication between the AU sub-system and the GW sub-system and other functions.

The baseband signal source including a BTS and a relay station, the baseband signal source including a femto base station and a relay station, and the baseband signal source including an RRU and a relay station are introduced as signal sources under substantially the same principle, which is as follows:

in the downlink, the relay station is coupled directly with a radio frequency signal output by the BTS, the RRU or the femto, performs analogue down-conversion and digital down-conversion on the radio frequency signal to obtain a baseband signal, and transmits the baseband signal to the EU 12; and in the uplink, the relay station performs digital up-conversion and analogue up-conversion on a baseband signal transmitted by the EU 12 to obtain a radio frequency signal, and transmits the radio frequency signal to the BTS, the RRU or the femto.

Taking the baseband signal source including the BTS and the relay station as an example, the operating principle of the baseband signal source can be particularly as follows:

in the downlink, the BTS couples a radio frequency signal from a mobile communication base station directly to the relay station, performs down-conversion processing on the radio frequency signal to obtain an intermediate-frequency signal, converts the intermediate-frequency signal into a digital signal through an A/D converter, converts the digital signal into I/Q baseband data through a DDC, a digital filter and other baseband signal processing units, and encapsulates the I/Q baseband data into a frame format suitable for IR (Interface between the RRU and the BBU)/CPRI (Common Public Radio Interface)/OBASI (Open Base Station Architecture Initiative) and other interface protocols and then transports it to the EU 12 through a digital optical fiber transceiver, digital optical fiber and the like; and in the uplink, the EU 12 converts a baseband signal transmitted by the RU 13 and then transports it back to the mobile communication base station in an inverse process to the above process.

In the baseband signal source including a BTS and a relay station, the BTS can be in a single-mode system or a dual-mode system; and the baseband signal source including a femto base station and a relay station, and the baseband signal source including an RRU and a relay station can also be in a single-mode system or a multi-mode system, for example, in the baseband signal source including a femto base station and a relay station, the femto base station can support multiple modes of 2G, 3G and WiFi and can perform a function of shunting data of 2G and 3G services.

In a wireless communication system using a baseband signal source including a BTS and a relay station, a baseband signal source including a femto base station and a relay station, and a baseband signal source including an RRU and a relay station, the signal sources are coupled directly with a radio frequency signal and thus can be implemented without opening their air interface protocols by original base station manufacturers to thereby make up for the absence of coverage by signals of the original base station and make full use of resources of the original base station to access, thus saving the investment.

The EU 12 is configured to decompose the downlink baseband high-rate signal transmitted by the baseband signal source 11 into multiple downlink sub-baseband high-rate signals and convert the downlink sub-baseband high-rate signals into downlink sub-baseband low-rate signals and then transmit the downlink sub-baseband low-rate signals to the RU 13, and to converge and convert uplink sub-baseband low-rate signals transmitted by the RU 13 into the uplink baseband high-rate signal and then transmit the uplink baseband high-rate signal to the baseband signal source 11.

Particularly the EU 12 includes a baseband processing unit and an output conversion unit.

The baseband processing unit is configured to decompose the downlink baseband high-rate signal transmitted by each baseband signal source 11 into the multiple downlink sub-baseband high-rate signals and transmit the downlink sub-baseband high-rate signals to an output conversion unit, and to converge the uplink sub-baseband low-rate signals transmitted by the RU 13 into an uplink baseband low-rate signal and then transmit the uplink baseband low-rate signal to the output conversion unit; and the output conversion unit is configured to convert the downlink sub-baseband high-rate signals transmitted by the baseband processing unit into the downlink sub-baseband low-rate signals and transmit the downlink sub-baseband low-rate signals to the RU 13, and to convert the uplink baseband low-rate signal transmitted by the baseband processing unit into the uplink baseband high-rate signal and then transmit the uplink baseband high-rate signal to the baseband signal source 11.

Furthermore, the baseband processing unit is further configured to combine the multiple downlink sub-baseband high-rate signals into multiple sets of superimposed downlink sub-baseband high-rate signals respectively for load capacities of RUs 13, and to transmit the multiple sets of superimposed downlink sub-baseband high-rate signals to the output conversion unit; and the output conversion unit is particularly configured to convert the multiple sets of superimposed downlink sub-baseband high-rate signals transmitted by the baseband processing unit into multiple sets of downlink sub-baseband low-rate signals, and to transmit the multiple sets of downlink sub-baseband low-rate signals to the RUs 13, wherein RUs 13 in a same cell receive a same set of downlink sub-baseband low-rate signals, and any two of RUs 13 in different cells receive different sets of downlink sub-baseband low-rate signals; the multiple downlink sub-baseband high-rate signals can be signals in the same system or can be signals in multiple systems; and the superimposed downlink sub-baseband high-rate signals can be a result of any combination and superimposition of one or more downlink sub-baseband high-rate signals of one or more baseband signal sources.

Particularly the EU 12 decomposes the downlink baseband high-rate signal transmitted by each baseband signal source 11 into the multiple downlink sub-baseband high-rate signals in the following steps:

Step 1: de-frame the downlink baseband high-rate signal to obtain multiple I/Q signals; and Step 2: decompose the multiple I/Q signals of each downlink baseband high-rate signal into N downlink sub-baseband high-rate signals, each of which includes one or more I/Q signals; where preferably N is the number of RUs 13, and N is a positive number.

Furthermore the baseband processing unit combines the multiple downlink sub-baseband high-rate signals into the multiple sets of superimposed downlink sub-baseband high-rate signals respectively for the load capacities of the RUs 13 particularly in the following steps:

Taking dual modes of WCDMA and GSM as an example, the baseband processing unit decomposes the downlink baseband high-rate signal transmitted by the baseband signal source 11 into the multiple downlink sub-baseband high-rate signals, where it is assumed that each of the downlink sub-baseband high-rate signals includes 3 WCDMA I/Q signals and 8 GSM I/Q signals, and the baseband processing unit combines the multiple downlink sub-baseband high-rate signals into the multiple sets of superimposed downlink sub-baseband high-rate signals for the load capacities of the RUs 13, where it is assumed that the EU 12 corresponds to three RUs 13.

(1) In a split-cell mode, that is, when the respective RUs 13 are in different cells:

a superimposed downlink sub-baseband high-rate signal a to be transmitted by the EU 12 to the first RU 13 includes 1 WCDMA I/Q signal and 3 GSM I/Q signals;

a superimposed downlink sub-baseband high-rate signal b to be transmitted by the EU 12 to the second RU 13 includes 2 WCDMA I/Q signals and 3 GSM I/Q signals; and a superimposed downlink sub-baseband high-rate signal c to be transmitted by the EU 12 to the third RU 13 includes 2 GSM I/Q signals.

(2) In a co-cell mode, that is, when the respective RUs 13 are in the same cell:

a superimposed downlink sub-baseband high-rate signal a to be transmitted by the EU 12 to the first RU 13 includes 3 WCDMA I/Q signals and 8 GSM I/Q signals;

a superimposed downlink sub-baseband high-rate signal b to be transmitted by the EU 12 to the second RU 13 includes 3 WCDMA I/Q signals and 8 GSM I/Q signals; and a superimposed downlink sub-baseband high-rate signal c to be transmitted by the EU 12 to the third RU 13 includes 3 WCDMA I/Q signals and 8 GSM I/Q signals.

It shall be noted that the superimposition way of the downlink sub-baseband high-rate signals has been described above in the embodiment of the invention only by way of an example and can be adapted in a practical application dependent upon the cell condition.

Furthermore the output conversion unit encapsulates the superimposed downlink sub-baseband high-rate signal a, the superimposed downlink sub-baseband high-rate signal b and the superimposed downlink sub-baseband high-rate signal c respectively in the synchronous Ethernet protocol to obtain a downlink sub-baseband low-rate signal a, a downlink sub-baseband low-rate signal b and a downlink sub-baseband low-rate signal c, and transmits the downlink sub-baseband low-rate signal a to the first RU 13, transmits the downlink sub-baseband low-rate signal b to the second RU 13 and transmits the downlink sub-baseband low-rate signal c to the third RU 13.

It shall be noted that the superimposed downlink sub-baseband low-rate signals can be encapsulated in another protocol in the embodiment of the invention, for example, the superimposed downlink sub-baseband low-rate signals can be encapsulated in an interface protocol supporting a Category-5 line, a Category Excess-5 line or a network line.

The RU 13 is configured to up-convert the downlink sub-baseband low-rate signals transmitted by the EU 12 into remote downlink radio frequency signals and transmit the remote downlink radio frequency signals to a user equipment, and to down-convert remote uplink radio frequency signals transmitted by the user equipment into uplink sub-baseband low-rate signals and then transmit the uplink sub-baseband low-rate signals to the EU 12; where the EU 12 and the at least one RU 13 connected therewith can also be referred to as a coverage sub-system or a Multimode Distributed Antenna System (MDAS).

Particularly the superimposed downlink sub-baseband low-rate signals and the uplink sub-baseband low-rate signals are signals suitable for Category-5 lines, Category Excess-5 lines or network lines or other low-rate transmission links, and the downlink baseband high-rate signal and the uplink baseband high-rate signal are signals suitable for optical fiber lines or data buses or other high-rate transmission links.

The baseband signal source 11 and the EU 12 can be connected via an optical fiber line or a data bus or another high-rate transmission link. When the baseband signal source 11 and the EU 12 are two different units, they are connected via an optical fiber line or an xPON (which is the general term of Passive Optical Networks (PONs) including a GPON, an EPON, etc.) or another high-rate transmission link. The downlink baseband high-rate signal and the uplink baseband high-rate signal are encapsulated in a standard communication protocol generally including IR/CPRI/OBASI and other interface protocols. When the baseband signal source 11 and the EU 12 are in the same unit, they can be connected via a data bus.

Since the EU 12 achieves the conversion between the downlink baseband high-rate signal and the downlink sub-baseband low-rate signals and the conversion between the uplink sub-baseband low-rate signals and the uplink baseband high-rate signal, when the baseband signal source 11 and the EU 12 are connected via an optical fiber line or a data bus to transmit the high-rate signals, the EU 12 and the RU 13 can be connected via a Category-5 line, a Category Excess-5 line or a network line or another low-rate transmission link, and the superimposed downlink sub-baseband low-rate signals and the uplink sub-baseband low-rate signals are encapsulated in an Ethernet protocol, e.g., the synchronous Ethernet protocol, as opposed to the conventional connection way of the BBU and the RRU via an optical fiber line and another high-rate transmission link, so that existing customer premises network resources deployed sufficiently can be well reused without laying out optical fiber cables to thereby facilitate entering home and indoor coverage and enable rapid network deployment at a low cost.

The RU 13 is connected with the user equipment via a standard interface (e.g., a 3G Uu interface or a GSM Um interface).

Second Embodiment

Figure 5:
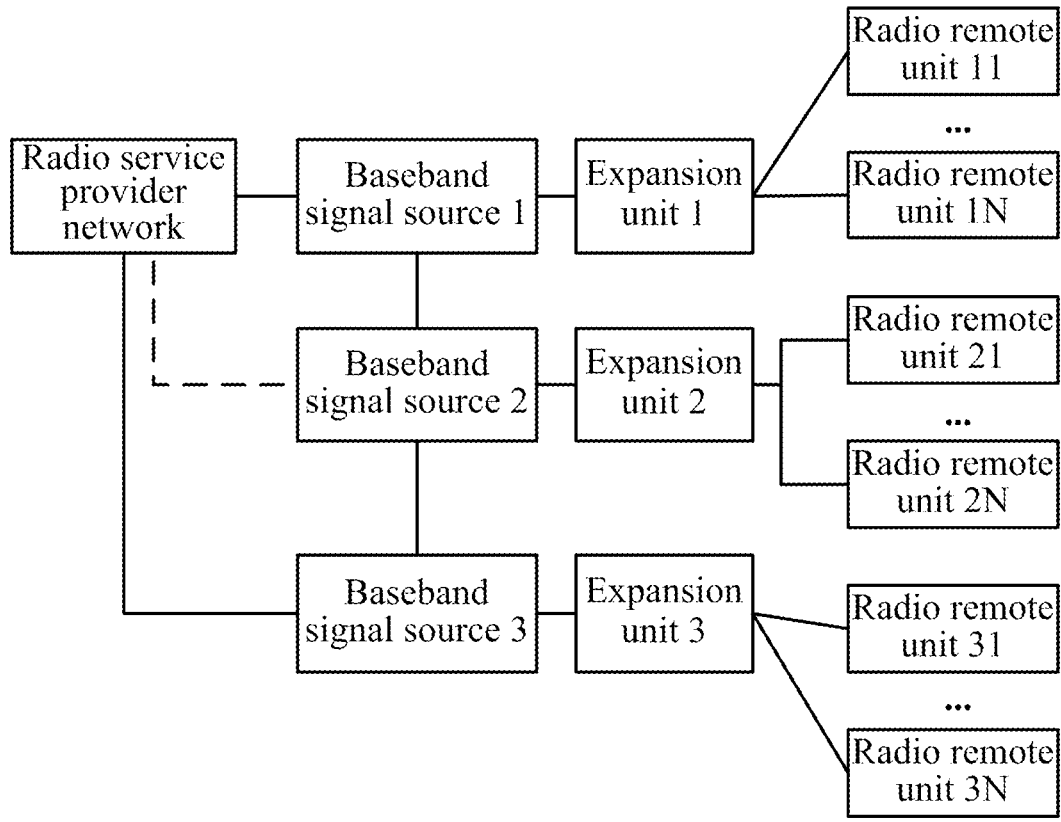
FIG. 5 is a schematic structural diagram of a wireless communication system adopting a networking mode where baseband signal sources are cascaded.

In the wireless communication system according to the embodiment of the invention, the baseband signal sources can be cascaded for network deployment. As shown in FIG. 5, there is a schematic structural diagram of a wireless communication system adopting a networking mode where baseband signal sources are cascaded. The wireless communication system includes a radio service provider network, multiple baseband signal sources, multiple EUs and at least one RU connected with the respective EUs, where the respective baseband signal sources further include cascade interfaces.

The respective baseband signal sources are connected sequentially via the local cascade interfaces, where the firstly arranged baseband signal source and the lastly arranged baseband signal source each is connected with a baseband signal source via the local cascade interface, and the remaining base band signal sources each is connected with two baseband signal sources via the local cascade interfaces; and in the meanwhile, the respective baseband signal sources are further connected with the corresponding EUs respectively, and typically the respective baseband signal sources are all connected with the radio service provider network.

As shown in FIG. 5, the wireless communication system includes three baseband signal sources which are a baseband signal source 1, a baseband signal source 2 and a baseband signal source 3 respectively, where the baseband signal source 1 is connected with the baseband signal source 2 via a local cascade interface; the baseband signal source 2 is connected with the baseband signal source 1 and the baseband signal source 3 via local cascade interfaces respectively; and the baseband signal source 3 is connected with the baseband signal source 2 via a local cascade interface; and in the meanwhile, the baseband signal source 1, the baseband signal source 2 and the baseband signal source 3 are all connected with the radio service provider network, and the baseband signal source 1, the baseband signal source 2 and the baseband signal source 3 are connected with corresponding EU1, EU2 and EU3, respectively.

Any one of the baseband signal sources is particularly configured, when its adjacent succeeding baseband signal source is disconnected from the radio service provider network, to receive downlink data transmitted by the radio service provider network to the adjacent succeeding baseband signal source and transmit the downlink data to the adjacent succeeding baseband signal source via the local cascade interface, and to receive uplink data to be transmitted by the adjacent succeeding baseband signal source via the local cascade interface and transmit the uplink data to the radio service provider network.

If a baseband signal source is disconnected from the radio service provider network, for example, as shown in FIG. 5, the baseband signal source 2 has a failing link to the radio service provider network and consequently is disconnected from the radio service provider network (the baseband signal source 2 is disconnected from the radio service provider network as denoted by a dotted line), then in the solution according to the second embodiment of the invention, the baseband signal source 1 can forward uplink data from the baseband signal source 2 to the radio service provider network and downlink data from the radio service provider network to the baseband signal source 2, to thereby ensure the operating link, and a particular flow thereof is as follows:

The baseband signal source 1 receives downlink data transmitted by the radio service provider network to the baseband signal source 2 and transmits the downlink data to the baseband signal source 2 via the local cascade interface, and receives uplink data to be transmitted by the baseband signal source 2 via the local cascade interface and transmits the uplink data to the radio service provider network.

In the solution according to the second embodiment of the invention, the respective baseband signal sources can be connected via optical fibers.

Third Embodiment

Figure 6:
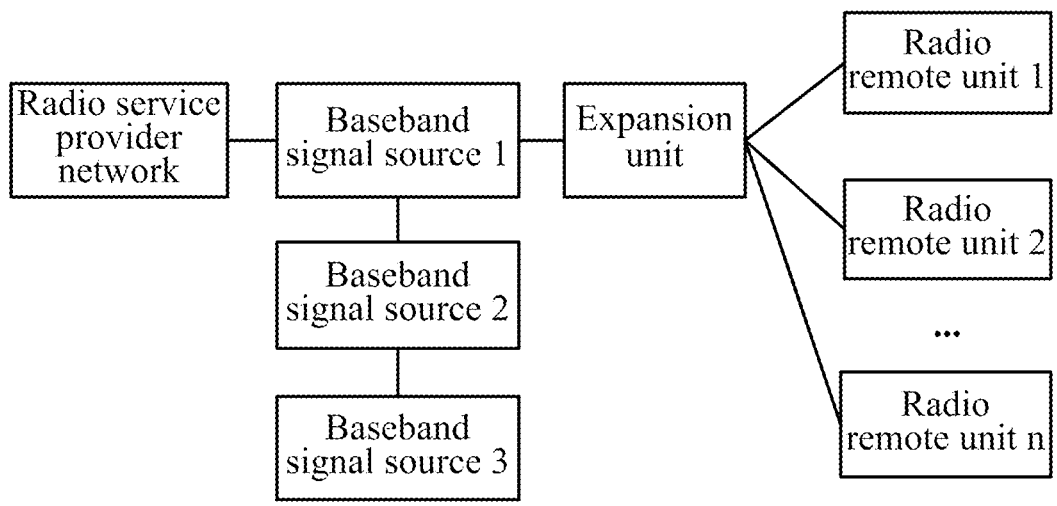
FIG. 6 is a schematic structural diagram of a wireless communication system adopting a networking mode where baseband signal sources are stacked.

In the wireless communication system according to the embodiment of the invention, the baseband signal sources can alternatively be stacked for network deployment. As shown in FIG. 6, there is a schematic structural diagram of a wireless communication system adopting a networking mode where baseband signal sources are stacked. The wireless communication system includes a radio service provider network, an EU, at least one RU connected with the EU, and multiple baseband signal sources, where one of the baseband signal sources is a master baseband signal source, and the remaining baseband signal sources are subordinate baseband signal sources, and the respective baseband signal sources further include stacking interfaces.

The master baseband signal source is connected respectively with the radio service provider network and the EU, and the subordinate baseband signal sources are connected sequentially via the local stacking interfaces, where the first subordinate baseband signal source is connected with the master baseband signal source via a stacking interface.

As shown in FIG. 6, the wireless communication system includes three baseband signal sources which are a baseband signal source 1, a baseband signal source 2 and a baseband signal source 3 respectively, where the baseband signal source 1 (the master baseband signal source) is connected with the radio service provider network and the EU, the baseband signal source 2 is connected with the baseband signal source 1 and the baseband signal source 3 via stacking interfaces respectively, and the baseband signal source 3 is connected with the baseband signal source 2 via a stacking interface.

The master baseband signal source is configured to receive downlink data transmitted by the radio service provider network, transmit, according to the number of carriers which can be handled locally, carrier signals contained in the downlink data beyond the number of carriers to the subordinate baseband signal sources via the stacking interface, convert downlink data, which is not transmitted to the subordinate baseband signal sources, into a downlink baseband high-rate signal, receive a converted downlink baseband high-rate signal returned by the subordinate baseband signal sources and transmit the downlink baseband high-rate signals to the EU, and to receive uplink baseband high-rate signals transmitted by the EU, transmit, according to the number of carriers which can be handled locally, carrier signals contained in the uplink baseband high-rate signals beyond the number of carriers to the subordinate baseband signal sources via the stacking interface, convert uplink baseband high-rate signals, which are not transmitted to the subordinate baseband signal sources, into uplink data, receive converted uplink data returned by the subordinate baseband signal sources and transmit the uplink data to the radio service provider network.

The subordinate baseband signal source is configured to receive downlink data transmitted by the master baseband signal source or a preceding subordinate baseband signal source, transmit, according to the number of carriers which can be handled locally, carrier signals contained in the downlink data beyond the number of carriers which can be handled locally to an adjacent succeeding subordinate baseband signal source via a stacking interface, convert downlink data, which is not transmitted to the succeeding subordinate baseband signal source, into a downlink baseband high-rate signal, receive converted downlink baseband high-rate signals returned by the succeeding subordinate baseband signal source and transmit the downlink baseband high-rate signals to the master baseband signal source or the preceding subordinate baseband signal source, and to receive uplink baseband high-rate signals transmitted by the master baseband signal source or the preceding subordinate baseband signal source, transmit, according to the number of carriers which can be handled locally, carrier signals contained in the uplink baseband high-rate signals beyond the number of carriers which can be handled locally to the adjacent succeeding subordinate baseband signal source via the stacking interface, convert uplink baseband high-rate signals, which are not transmitted to the succeeding subordinate baseband signal source, into uplink data, receive converted uplink data returned by the succeeding subordinate baseband signal source and transmit the uplink data to the master baseband signal source or the preceding subordinate baseband signal source.

Particularly, as shown in FIG. 6, it is assumed that preset thresholds of the numbers of carriers which can be handled by the baseband signal source 1, the baseband signal source 2 and the baseband signal source 3 are all 10, then when the number of carriers included in downlink data transmitted by the radio service provider network to the baseband signal source 1 is 30, the baseband signal source 1 will forward the remaining 20 carrier signals beyond the threshold to the baseband signal source 2 via the stacking interface and convert the downlink data, which is not transmitted to the baseband signal source 2, into a downlink baseband high-rate signal; the baseband signal source 2 determines that the 20 carrier signals also exceed its preset threshold 10 and thus transmits 10 carrier signals among the 20 carrier signals to the baseband signal source 3 and converts the downlink data, which is not transmitted to the baseband signal source 3, into a downlink baseband high-rate signal; and the baseband signal source 3 processes the 10 carrier signals transmitted by the baseband signal source 2 and forwards a downlink baseband high-rate signal of the baseband signal source 3 resulting from processing to the baseband signal source 2 via the stacking interface. The baseband signal source 2 forwards its own downlink baseband high-rate signal resulting from processing and the downlink baseband high-rate signal transmitted by the baseband signal source 3 to the baseband signal source 1, and the baseband signal source 1 transmits the downlink baseband high-rate signals processed by the baseband signal source 1, the baseband signal source 2 and the baseband signal source 3 to the EU.

When an uplink baseband high-rate signal transmitted by the EU to the baseband signal source 1 includes 20 carriers, the baseband signal source 1 will forward the remaining 10 carrier signals beyond the threshold 10 to the baseband signal source 2 via the stacking interface, the baseband signal source 2 processes the received 10 carrier signals to obtain uplink data and forwards the uplink data to the baseband signal source 1 via the stacking interface, and the baseband signal source 1 transmits its own processed uplink data and the uplink data processed by the baseband signal source 2 to the radio service provider network.

With the mode of stacking the baseband signal sources for network deployment in the third embodiment of the invention, if the system needs to be extended in capacity, then multiple baseband signal sources can be added simply to a machine room in which the original baseband signal source are set up to thereby double the processing capacity of the system without influencing any user, so that the system can be extended in capacity more easily and at a greatly lowered cost of extension in capacity.

There is a technical solution of distributed BBUs in the prior art where multiple BBUs are connected directly with an RNC, and in this network architecture system, when the system needs to be extended in capacity, RRUs and the RNC need to be configured to create a relationship between carriers and corresponding BBUs, that is, if 100 carriers are supported on one RRU and there are two distributed BBUs in the system, then the first 50 carriers need to be configured on the first BBU for processing, and the last 50 carriers need to be configured on the second BBU for processing. However in the third embodiment of the invention, when a baseband signal source determines that it can not satisfy the current carrier requirement, it will allocate carrier data automatically to a subordinate baseband signal source for processing without setting any EU, RU, etc., thus making the network deployment more flexibly and facilitating the extension of the system in capacity; and in the meanwhile, from the perspective of engineering deployment, with the mode of stacking the baseband signal sources for network deployment in the third embodiment of the invention, the respective subordinate baseband signal sources need not be connected with the radio service provider network, the EU or the RU, to thereby lower the difficulty of network deployment and the waste of resources.

Fourth Embodiment

Figure 7:
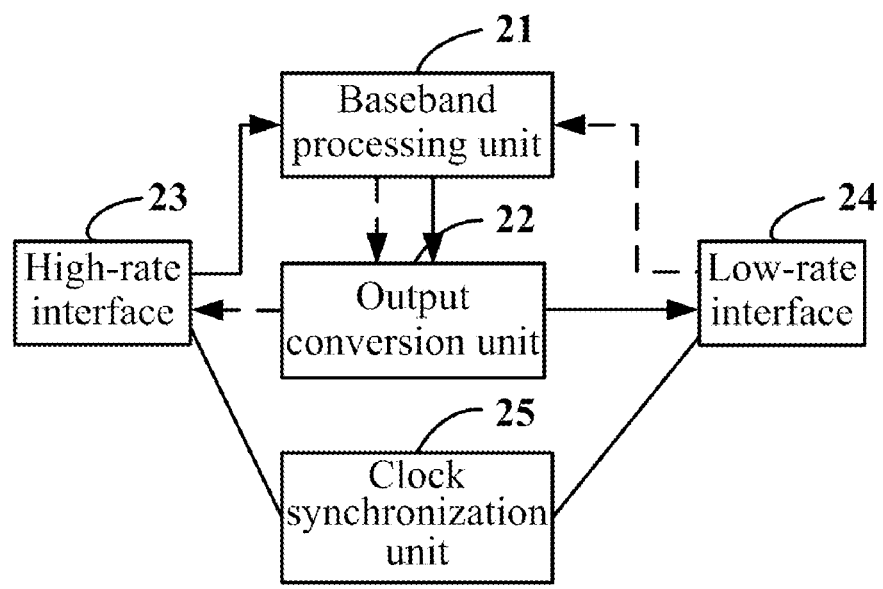
FIG. 7 is a schematic structural diagram of an EU according to a fourth embodiment of the invention.

As shown in FIG. 7, there is a schematic structural diagram of an EU in the fourth embodiment of the invention, where the EU includes a baseband processing unit 21 and an output conversion unit 22.

The baseband processing unit 21 is configured to decompose a received downlink baseband high-rate signal into multiple downlink sub-baseband high-rate signals and transmit the multiple downlink sub-baseband high-rate signals to an output conversion unit 22, and to converge received uplink sub-baseband low-rate signals into an uplink baseband low-rate signal and then transmit the uplink baseband low-rate signal to the output conversion unit 22; and the output conversion unit 22 is configured to convert the downlink sub-baseband high-rate signals transmitted by the baseband processing unit 21 into downlink sub-baseband low-rate signals and then output the downlink sub-baseband low-rate signals, and to convert the uplink baseband low-rate signal transmitted by the baseband processing unit 21 into an uplink baseband high-rate signal and then output the uplink baseband high-rate signal.

Particularly the output conversion unit 22 performs protocol conversion on the downlink sub-baseband high-rate signals transmitted by the baseband processing unit 21 from a high-rate protocol to a low-rate protocol to obtain and then output the downlink sub-baseband low-rate signals, and performs protocol conversion on the uplink baseband low-rate signal transmitted by the baseband processing unit 21 from the low-rate protocol to the high-rate protocol to obtain and then output the uplink baseband high-rate signal, where the high-rate protocol includes IR/CPRI/OBSAI and other interface protocols supporting communications over an optical fiber link, and the low-rate protocol includes an Ethernet transmission protocol and other interface protocols supporting communications over a Category-5 line, a Category Excess-5 line or a network line.

The conversion from the high-rate protocol into the low-rate protocol refers to conversion of signal data encapsulated originally in the high-rate protocol into being encapsulated in the low-rate protocol; and the conversion from the low-rate protocol to the high-rate protocol refers to conversion of signal data encapsulated originally in the low-rate protocol into being encapsulated in the high-rate protocol.

Furthermore the baseband processing unit 21 is further configured to combine the multiple downlink sub-baseband high-rate signals into multiple sets of superimposed downlink sub-baseband high-rate signals respectively for load capacities of RUs receiving the downlink sub-baseband low-rate signals, and to transmit the multiple sets of superimposed downlink sub-baseband high-rate signals to the output conversion unit 22; and the output conversion unit 22 is particularly configured to convert the multiple sets of superimposed downlink sub-baseband high-rate signals transmitted by the baseband processing unit 21 into multiple sets of downlink sub-baseband low-rate signals, and to transmit the multiple sets of downlink sub-baseband low-rate signals to the RUs, where RUs in a same cell receive a same set of downlink sub-baseband low-rate signals, and any two of RUs in different cells receive different sets of downlink sub-baseband low-rate signals.

Taking dual modes of WCDMA and GSM as an example, the baseband processing unit decomposes the downlink baseband high-rate signal transmitted by the AU sub-system 11 into multiple downlink sub-baseband high-rate signals, where it is assumed that each of the downlink sub-baseband high-rate signals includes 3 WCDMA I/Q signals and 8 GSM I/Q signals, and the baseband processing unit combines the multiple downlink sub-baseband high-rate signals into multiple sets of superimposed downlink sub-baseband high-rate signals for the load capacities of the RUs, where it is assumed that the EU corresponds to three RUs.

(1) In a split-cell mode, that is, when the respective RUs are in different cells:

a superimposed downlink sub-baseband high-rate signal a to be transmitted by the EU to the first RU includes 1 WCDMA I/Q signal and 3 GSM I/Q signals;

a superimposed downlink sub-baseband high-rate signal b to be transmitted by the EU to the second RU includes 2 WCDMA I/Q signals and 3 GSM I/Q signals; and a superimposed downlink sub-baseband high-rate signal c to be transmitted by the EU to the third RU includes 2 GSM I/Q signals.

(2) In a co-cell mode, that is, when the respective RUs are in the same cell:

a superimposed downlink sub-baseband high-rate signal a to be transmitted by the EU to the first RU includes 3 WCDMA I/Q signals and 8 GSM I/Q signals;

a superimposed downlink sub-baseband high-rate signal b to be transmitted by the EU to the second RU includes 3 WCDMA I/Q signals and 8 GSM I/Q signals; and a superimposed downlink sub-baseband high-rate signal c to be transmitted by the EU to the third RU includes 3 WCDMA I/Q signals and 8 GSM I/Q signals.

It shall be noted that the superimposition way of the downlink sub-baseband high-rate signals has been described above in the embodiment of the invention only by way of an example and can be adapted in a practical application dependent upon the cell condition.

Furthermore the output conversion unit encapsulates the superimposed downlink sub-baseband high-rate signal a, the superimposed downlink sub-baseband high-rate signal b and the superimposed downlink sub-baseband high-rate signal c respectively in the synchronous Ethernet protocol to obtain a downlink sub-baseband low-rate signal a, a downlink sub-baseband low-rate signal b and a downlink sub-baseband low-rate signal c, and transmits the downlink sub-baseband low-rate signal a to the first RU, transmits the downlink sub-baseband low-rate signal b to the second RU and transmits the downlink sub-baseband low-rate signal c to the third RU.

It shall be noted that the superimposed downlink sub-baseband low-rate signals can be encapsulated in another protocol in the embodiment of the invention, for example, the superimposed downlink sub-baseband low-rate signals can be encapsulated in an interface protocol supporting a Category-5 line, a Category Excess-5 line or a network line.

Furthermore the EU further includes a high-rate interface 23 and a low-rate interface 24, where:

the high-rate interface 23 supports the high-rate transmission protocol and is configured to receive the downlink baseband high-rate signal and transmit the downlink baseband high-rate signal to the baseband processing unit 21, and to output the uplink baseband high-rate signal converted by the output conversion unit 22; and the low-rate interface 24 supports the low-rate transmission protocol and is configured to receive the uplink sub-baseband low-rate signals and transmit the uplink sub-baseband low-rate signals to the baseband processing unit 21, and to output the downlink sub-baseband low-rate signals converted by the output conversion unit 22.

Preferably the EU further includes a clock synchronization unit 25 configured to extract a synchronization clock source from the high-rate interface 23 and transmit the synchronization clock source to the low-rate interface 24, to thereby perform clock synchronization between the high-rate interface 23 and the low-rate interface 24.

EUs can exist as a separate device or can be a sub-system applied in the wireless communication systems of the flat network architecture according to the first embodiment to the third embodiment of the invention.

Figure 8:
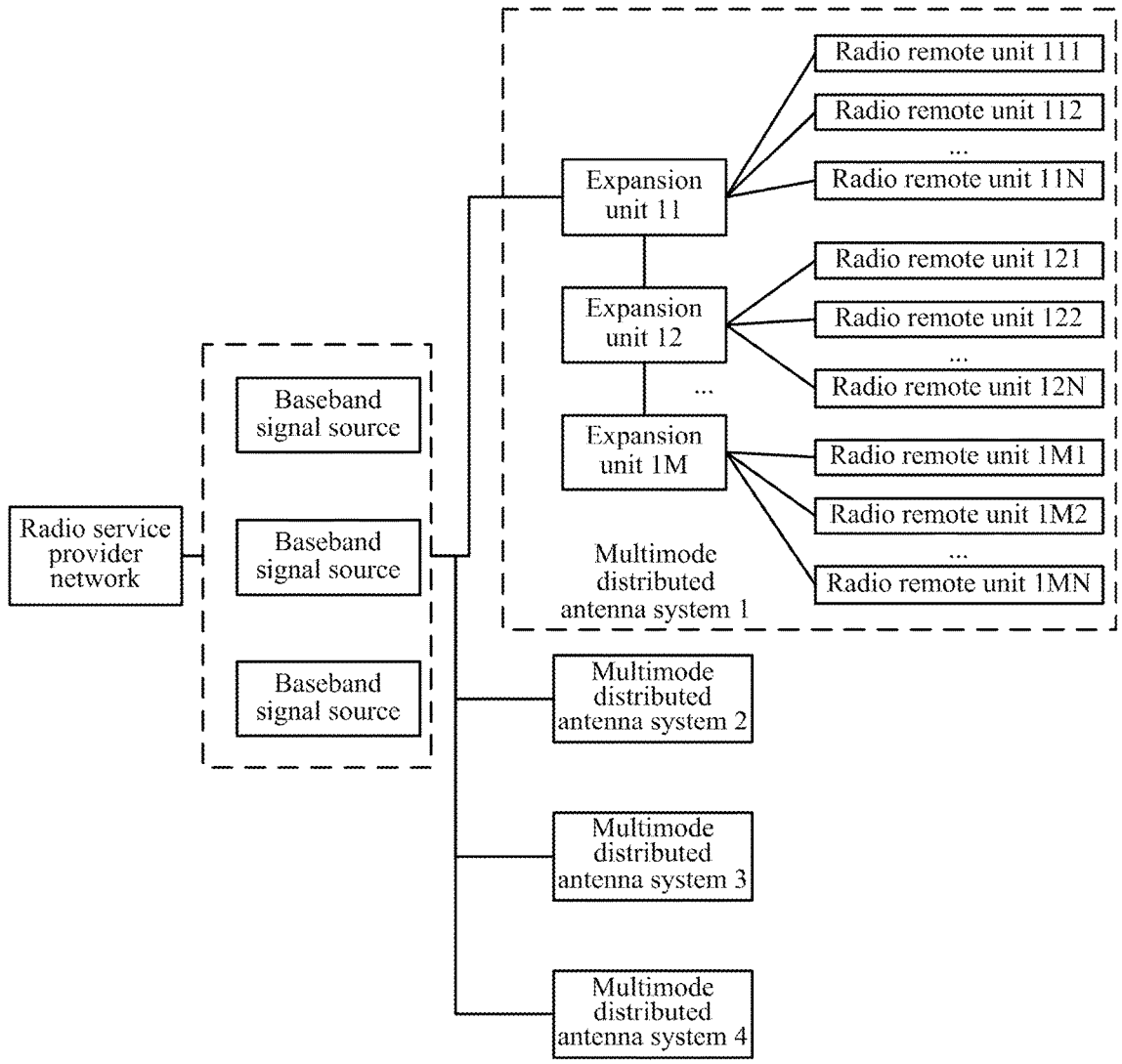
FIG. 8 is a schematic structural diagram of a wireless communication system adopting a networking mode where EUs are cascaded.

When the EUs are a sub-system applied in the wireless communication system of the flat network architecture according to any one of the first embodiment to the third embodiment of the invention, the following cascade networking mode can be adopted:

As shown in FIG. 8, there is a schematic structural diagram of a wireless communication system adopting a networking mode where EUs are cascaded according to the fourth embodiment of the invention. The wireless communication system includes a radio service provider network, at least one baseband signal source and at least one MDAS, where the MDAS includes at least one EU and at least one RU connected with the respective EUs, and the EU includes two high-rate interfaces.

Particularly for any one of the MDASs, the respective EUs are connected sequentially via local high-rate interfaces, where the firstly arranged EU and the lastly arranged EU each is connected with an EU via one local high-rate interface, and the remaining EUs each is connected with two EUs via two local high-rate interfaces respectively; and in the meanwhile, each EU is further connected with at least one RU corresponding thereto, and the firstly arranged EU is further connected with a baseband signal source via the other high-rate interface.

As shown in FIG. 8, the wireless communication system includes an MDAS 1, an MDAS 2, an MDAS 3 and an MDAS 4, and the respective MDASs are all connected with the baseband signal source over optical fibers or other high-rate transmission links. The MDAS 1 includes M EUs which are an EU 11, an EU 12, . . . , and an EU 1M, and each EU is connected with N RUs, for example, the EU 11 is connected with RUs including an RU 11, an RU 12, . . . , and an RU 1N, where both M and N are positive integers.

Particularly the EU 11 is connected with an AU sub-system via a first high-rate interface and with a first high-rate interface of the EU 12 via a second high-rate interface; and a second high-rate interface of the EU 12 is connected with a first high-rate interface of . . . the EU 1M, to thereby form the cascaded EUs.

Particularly in the downlink, the baseband signal source converts downlink data transmitted by the radio service provider network into a downlink baseband high-rate signal and then inputs it to the EU 11 via the first high-rate interface of the EU 11, where a part of the downlink baseband high-rate signal is converted into multiple superimposed downlink sub-baseband signals by a baseband processing unit and an output conversion unit of the EU 11 and then the multiple superimposed downlink sub-baseband signals are output via a low-rate interface, and the other part of the downlink baseband high-rate signal is output directly to the EU 12 via the second high-rate interface of the EU 11.

In the uplink, uplink sub-baseband low-rate signals transmitted by the RU 121 to the RU 12N are input via a low-rate interface of the EU 12 and converted into an uplink baseband high-rate signal by a baseband processing unit and an output conversion unit of the EU 12, and then the uplink baseband high-rate signal is input from the first high-rate interface of the EU 12 to the second high-rate interface of the EU 11 and transmitted to the baseband signal source via the first high-rate interface of the EU 11; and in the meanwhile, the EU 11 further converts uplink sub-baseband low-rate signals transmitted by the respective RUs connected therewith into an uplink baseband high-rate signal and then transmits it to the baseband signal source via the first high-rate interface.

In the co-cell mode, uplink data between different EUs has an OR relationship, and in the split-cell mode, uplink data between different EUs has an AND relationship.

It shall be noted that the wireless communication system according to the embodiment of the invention can further support star network deployment of EUs, daisy chaining and star network deployment of RUs, hybrid network deployment and other network deployment patterns.

Fifth Embodiment

Figure 9:
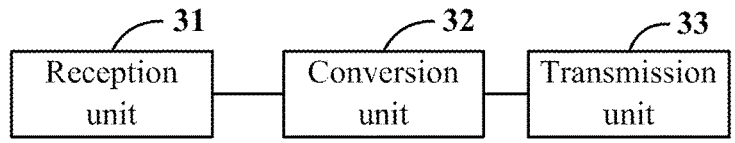
FIG. 9 is a schematic structural diagram of a baseband signal source according to a fifth embodiment of the invention.

As shown in FIG. 9, there is a schematic structural diagram of a baseband signal source according to the fifth embodiment of the invention, where the baseband signal source includes a reception unit 31, a conversion unit 32 and a transmission unit 33.

The baseband signal source includes one or more of the following baseband signal sources:

a baseband signal source including a GW sub-system and an AU sub-system, a baseband signal source including a BTS and a relay station, a baseband signal source including a femto base station and a relay station, a baseband signal source including an RRU and a relay station, and another baseband signal source capable of outputting a baseband signal and the like.

The reception unit 31 is configured to receive downlink data and to receive an uplink baseband high-rate signal; the conversion unit 32 is configured to convert the downlink data received by the reception unit 31 into a downlink baseband high-rate signal and to convert the uplink baseband high-rate signal received by the reception unit 31 into uplink data; and the transmission unit 33 is configured to transmit the downlink baseband high-rate signal and the uplink data obtained by the conversion unit 32 through conversion.

It shall be noted that the baseband signal source in the fifth embodiment of the invention can be either of the baseband signal sources in the second embodiment and the third embodiment, for example, when the baseband signal source is applied in the wireless communication system in the third embodiment, it can be a master baseband signal source or can be any one of the subordinate baseband signal sources.

Sixth Embodiment

Figure 10:
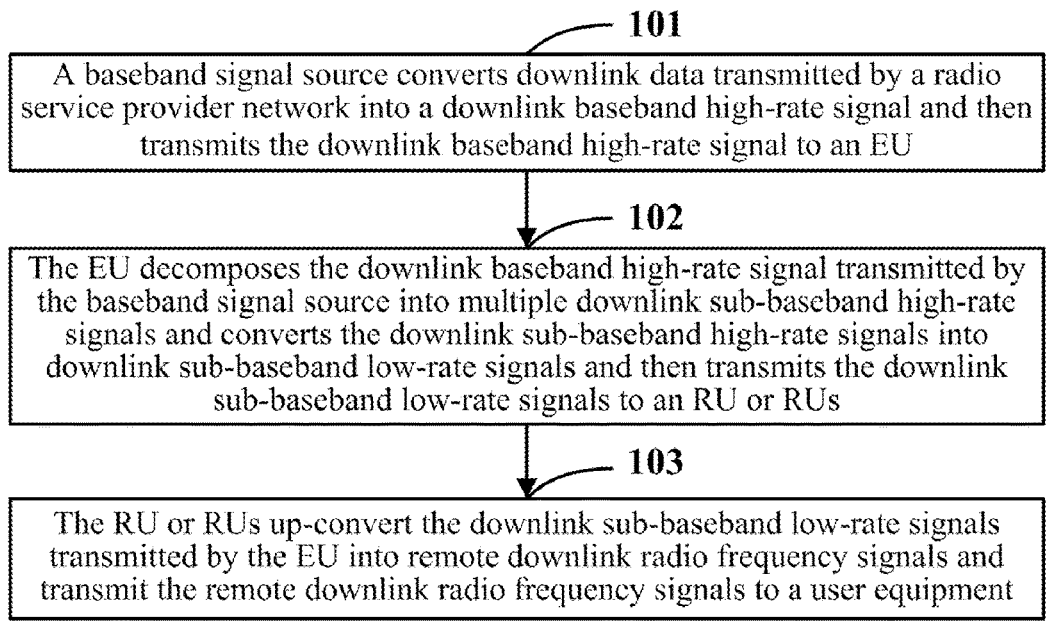
FIG. 10 is a schematic flow chart of a wireless communication method of a flat network architecture according to a sixth embodiment of the invention.

As shown in FIG. 10, there is a schematic flow chart of a wireless communication method of a flat network architecture according to the sixth embodiment of the invention, where the method includes the following steps:

Step 101: a baseband signal source converts downlink data transmitted by a radio service provider network into a downlink baseband high-rate signal and then transmits the downlink baseband high-rate signal to an EU.

The baseband signal source can be one or more of a baseband signal source including a GW sub-system and an AU sub-system, a baseband signal source including a BTS and a relay station, a baseband signal source including a femto base station and a relay station, a baseband signal source including an RRU and a relay station, and another baseband signal source capable of outputting a baseband signal and the like.

Step 102: the EU decomposes the downlink baseband high-rate signal transmitted by the baseband signal source into multiple downlink sub-baseband high-rate signals and converts the downlink sub-baseband high-rate signals into downlink sub-baseband low-rate signals and then transmits the downlink sub-baseband low-rate signals to an RU or RUs.

Particularly, the EU decomposes the downlink baseband high-rate signal transmitted by the baseband signal source into the multiple downlink sub-baseband high-rate signals, combines the multiple downlink sub-baseband high-rate signals into multiple sets of superimposed downlink sub-baseband high-rate signals for the load capacity or capacities of the RU or RUs, converts the multiple sets of superimposed downlink sub-baseband high-rate signals into multiple sets of superimposed downlink sub-baseband low-rate signals and then routes and transmits them to the one or more RUs respectively.

The multiple downlink sub-baseband high-rate signals can be signals in the same system or can be signals in multiple systems; and the superimposed downlink sub-baseband high-rate signals can be a result of any combination and superimposition of the one or more downlink sub-baseband high-rate signals.

Step 103: the RU or RUs up-convert the downlink sub-baseband low-rate signals transmitted by the EU into remote downlink radio frequency signals and transmit the remote downlink radio frequency signals to a user equipment.

Specifically, the RU performs a de-framing operation on the superimposed downlink sub-baseband low-rate signals transmitted by the EU to obtain corresponding baseband signals in one or more modes, performs corresponding up-conversion operations respectively on the baseband signals in different modes to convert them into remote downlink radio frequency signals in one or more modes, and transmits the remote downlink radio frequency signals to the user equipment.

The downlink transmission process according to the sixth embodiment of the invention has been described above, and the uplink transmission process is an inverse process thereto and can be particularly as follows:

The RU down-converts remote uplink radio frequency signals transmitted by the user equipment into uplink sub-baseband low-rate signals and then transmits them to the EU; the EU converges and converts the uplink sub-baseband low-rate signals transmitted by the RU into an uplink baseband high-rate signal and then transmits it to the baseband signal source; and the baseband signal source converts the uplink baseband high-rate signal transmitted by the EU into uplink data and then transmits it to the radio service provider network.

Seventh Embodiment

The wireless communication method according to the sixth embodiment will be described in details by way of a particular example in the seventh embodiment of the invention, where it is assumed that the baseband signal source is a baseband signal source including a GW sub-system and an AU sub-system.

Figure 11:
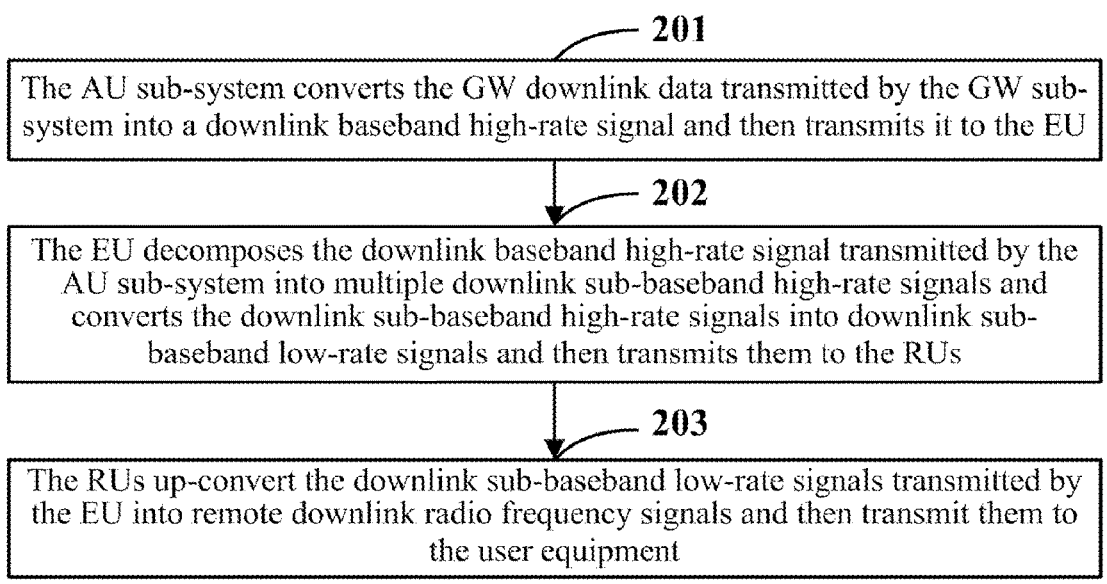
FIG. 11 is a schematic flow chart of a wireless communication method according to a seventh embodiment of the invention.

Taking dual modes of WCDMA and GSM as an example, it is assumed that GW downlink data transmitted from the GW sub-system to the AU sub-system includes 8 GSM carriers and 3 WCDMA carriers, and as shown in FIG. 11, there is a schematic flow chart of a wireless communication method according to the seventh embodiment of the invention, where the method includes the following steps:

Step 201: the AU sub-system converts the GW downlink data transmitted by the GW sub-system into a downlink baseband high-rate signal and then transmits it to the EU.

Particularly, the AU sub-system performs baseband processing respectively on the received GW hybrid downlink data (i.e., the GW downlink data) including 8 GSM carriers and 3 WCDMA carriers to obtain GSM I/Q signals and WCDMA I/Q signals, and performs a framing operation on the GSM I/Q signals and the WCDMA I/Q signals to obtain the downlink baseband high-rate signal.

Figure 12:
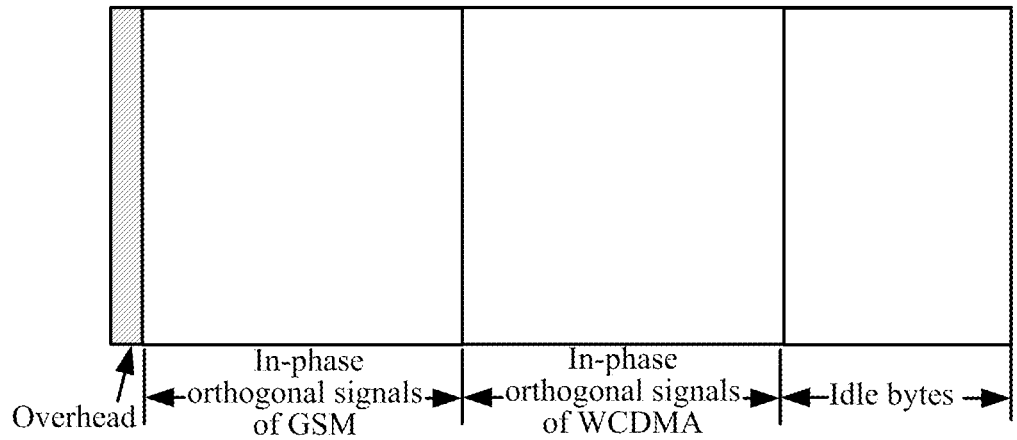
FIG. 12 is a schematic diagram of a data structure of transmission data in a single sub-frame.

The downlink baseband high-rate signal is transmitted in a multi-frame form including multiple sub-frames, where contents transmitted in the sub-frames include three parts which are overhead bytes, GSM-system I/Q signals and WCDMA-system I/Q signals, and idle bytes. As shown in FIG. 12, there is a schematic diagram of a data structure of transmission data of a downlink baseband high-rate signal in a single sub-frame, where the data structure includes overhead bytes, 8 GSM-system I/Q signals and 3 WCDMA-system I/Q signals, and idle bytes. It shall be noted that the data structure shown in FIG. 12 is a data structure adopted for the specific transmission scheme in the seventh embodiment, and the data structure can be adapted when another transmission scheme is used in the seventh embodiment of the invention.

Figure 13:
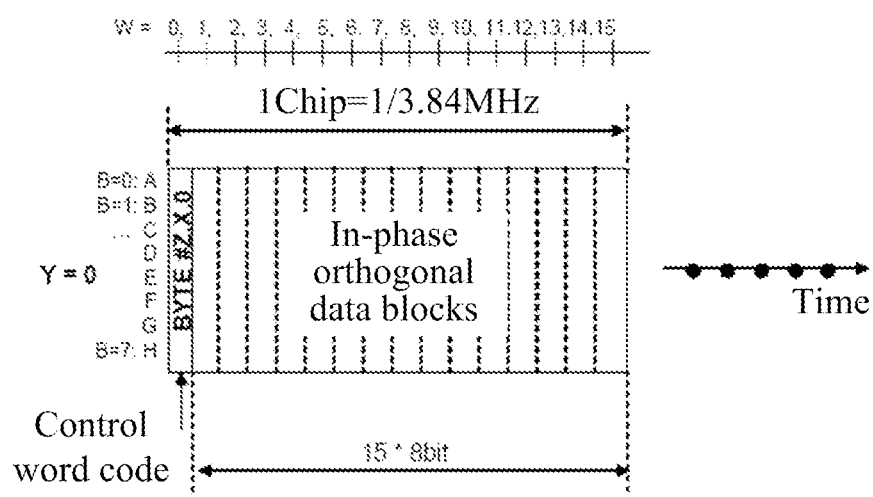
FIG. 13 is a schematic diagram of a CPRI-encapsulated data structure.

The transmission data of the downlink baseband high-rate signal is transmitted in one frame after another, and multiple sub-frames constitute one multiframe and then the multiframe is encapsulated in the CPRI protocol. As shown in FIG. 13, there is a CPRI encapsulation scheme at a line rate of 614.4 M-bits/s; and it shall be noted that the transmission data of the downlink baseband high-rate signal is encapsulated in the CPRI protocol in the seventh embodiment of the invention, but the transmission data of the downlink baseband high-rate signal can alternatively be encapsulated in another protocol in the seventh embodiment of the invention, for example, the data can be encapsulated in IR/OBSAI or other interface protocols supporting communications over an optical fiber link at another data rate in compliance with a required data rate suitable for an system application.

Step 202: the EU decomposes the downlink baseband high-rate signal transmitted by the AU sub-system into multiple downlink sub-baseband high-rate signals and converts the downlink sub-baseband high-rate signals into downlink sub-baseband low-rate signals and then transmits them to the RUs.

Particularly, the baseband processing unit of the EU performs the de-framing operation on the downlink baseband high-rate signal transmitted by the AU sub-system in the CPRI protocol into multiple WCDMA and GSM I/Q signals, i.e., the downlink sub-baseband high-rate signals; and since each of the sub-frames generated in the first step includes 3 WCDMA I/Q signals and 8 GSM I/Q signals, the 3 WCDMA I/Q signals and the 8 GSM I/Q signals can be obtained through the de-framing operation in the second step.

Furthermore the baseband processing unit of the EU combines the multiple downlink sub-baseband high-rate signals into multiple sets of superimposed downlink sub-baseband high-rate signals respectively for load capacities of the RUs, where it is assumed that the EU corresponds to three RUs which are an RU 1, an RU 2 and an RU 3 respectively.

(1) In a split-cell mode:
a superimposed downlink sub-baseband high-rate signal a to be transmitted by the EU to the RU 1 includes 1 WCDMA I/Q signal and 3 GSM I/Q signals;
a superimposed downlink sub-baseband high-rate signal b to be transmitted by the EU to the RU 2 includes 2 WCDMA I/Q signals and 3 GSM I/Q signals; and
a superimposed downlink sub-baseband high-rate signal c to be transmitted by the EU to the RU 3 includes 2 GSM I/Q signals.

(2) In a co-cell mode:
a superimposed downlink sub-baseband high-rate signal a to be transmitted by the EU to the RU 1 includes 3 WCDMA I/Q signals and 8 GSM I/Q signals;
a superimposed downlink sub-baseband high-rate signal b to be transmitted by the EU to the RU 2 includes 3 WCDMA I/Q signals and 8 GSM I/Q signals; and
a superimposed downlink sub-baseband high-rate signal c to be transmitted by the EU to the RU 3 includes 3 WCDMA I/Q signals and 8 GSM I/Q signals.

It shall be noted that the superimposition way of the downlink sub-baseband high-rate signals has been described above in the seventh embodiment of the invention only by way of an example and can be adapted in a practical application dependent upon the cell condition.

Furthermore the output conversion unit of the EU encapsulates the superimposed downlink sub-baseband high-rate signal a, the superimposed downlink sub-baseband high-rate signal b and the superimposed downlink sub-baseband high-rate signal c respectively in the synchronous Ethernet protocol to obtain a downlink sub-baseband low-rate signal a, a downlink sub-baseband low-rate signal b and a downlink sub-baseband low-rate signal c, and transmits the downlink sub-baseband low-rate signal a to the RU 1, transmits the downlink sub-baseband low-rate signal b to the RU 2 and transmits the downlink sub-baseband low-rate signal c to the RU 3.

It shall be noted that the superimposed downlink sub-baseband low-rate signals can be encapsulated in another protocol in the seventh embodiment of the invention, for example, the superimposed downlink sub-baseband low-rate signals can be encapsulated in an interface protocol supporting a Category-5 line, a Category Excess-5 line or a network line.

Step 203: the RUs up-convert the downlink sub-baseband low-rate signals transmitted by the EU into remote downlink radio frequency signals and then transmit them to the user equipment.

(1) In the split-cell mode:
The RU 1 performs the de-framing operation on the downlink sub-baseband low-rate signal a transmitted by the EU to obtain the 1 WCDMA I/Q signal and the 3 GSM I/Q signals in the synchronous Ethernet protocol and then up-converts them into a WCDMA radio frequency signal and a GSM radio frequency signal and transmits them to the user equipment;

The RU 2 performs the de-framing operation on the downlink sub-baseband low-rate signal b transmitted by the EU to obtain the 2 WCDMA I/Q signals and the 3 GSM I/Q signals in the synchronous Ethernet protocol and then up-converts them into a WCDMA radio frequency signal and a GSM radio frequency signal and transmits them to the user equipment; and The RU 3 performs the de-framing operation on the downlink sub-baseband low-rate signal c transmitted by the EU to obtain the 2 GSM I/Q signals in the synchronous Ethernet protocol and then up-converts them into a GSM radio frequency signal and transmits it to the user equipment.

(2) In the co-cell mode:
The RU 1, the RU 2 and the RU 3 perform de-framing operations on the downlink sub-baseband low-rate signals a, b and c transmitted by the EU into the 3 WCDMA I/Q signals and the 8 GSM I/Q signals respectively in the synchronous Ethernet protocol and then up-convert them into WCDMA radio frequency signals and GSM radio frequency signals and transmit them to the user equipment.

The downlink transmission process according to the seventh embodiment of the invention has been described above, and the uplink transmission process is an inverse process thereto and can be particularly as follows:

In a first step, one RU receives remote uplink radio frequency signals transmitted by the user equipment, down-converts the remote uplink radio frequency signals into baseband signals in one or more modes, performs the framing operation on the baseband signals in the data structure shown in FIG. 12 and then encapsulates them into uplink sub-baseband low-rate signals in the synchronous Ethernet protocol and transmits them to the EU.

Particularly the data structure shown in FIG. 12 can be adapted when another transmission scheme is used in the embodiment of the invention; and moreover the framed uplink sub-baseband low-rate signals can alternatively be encapsulated in another protocol, e.g., an interface protocol supporting a Category-5 line, a Category Excess-5 line or a network line.

In a second step, the processing unit of the EU performs the de-framing operation on uplink sub-baseband low-rate signals a', b' and c' transmitted by the RU 1, the RU 2 and the RU 3 in the synchronous Ethernet protocol to obtain WCDMA I/Q signals and GSM I/Q signals and recombines them into sub-frames in the data structure shown in FIG. 12, where the multiple sub-frames constitute one multiframe, and generates an uplink baseband low-rate signal in the multi-frame form and then transmits it to the conversion unit; and the conversion unit encapsulates the uplink baseband low-rate signal into an uplink baseband high-rate signal in the CPRI protocol and transmits it to the AU sub-system.

(1) In the Split-Cell Mode:

1 WCDMA I/Q signal and 3 GSM I/Q signals of the uplink sub-baseband low-rate signal a', 2 WCDMA I/Q signals and 3 GSM I/Q signals of the uplink sub-baseband low-rate signal b', and 2 GSM I/Q signals of the uplink sub-baseband low-rate signal c' constitute an uplink baseband low-rate signal including 3 WCDMA I/Q signals and 8 GSM I/Q signals.

(2) In the Co-Cell Mode:

3 WCDMA I/Q signals and 8 GSM I/Q signals of the uplink sub-baseband low-rate signal a', 3 WCDMA I/Q signals and 8 GSM I/Q signals of the uplink sub-baseband low-rate signal b', and 3 WCDMA I/Q signals and 8 GSM I/Q signals of the uplink sub-baseband low-rate signal c' constitute an uplink baseband low-rate signal including 3 WCDMA I/Q signals and 8 GSM I/Q signals; and in the co-cell mode, there is an OR relationship between the uplink sub-baseband low-rate signals and the uplink baseband low-rate signal, that is, the I signals of the uplink sub-baseband low-rate signal a'+the I signals of the uplink sub-baseband low-rate signal b'+the I signals of the uplink sub-baseband low-rate signal c'=the I signals of the uplink baseband low-rate signal; and the Q signals of the uplink sub-baseband low-rate signal a'+the Q signals of the uplink sub-baseband low-rate signal b'+the Q signals of the uplink sub-baseband low-rate signal c'=the Q signals of the uplink baseband low-rate signal, where the symbol "+" represents the "OR" relationship.

The output conversion unit encapsulates the uplink baseband low-rate signal in the CPRI protocol into an uplink baseband high-rate signal and transmits it to the AU sub-system.

In a third step, the AU sub-system performs the de-framing operation on the uplink baseband high-rate signal, transmitted by the EU in the multi-frame form, in the CPRI protocol to obtain the WCDMA and GSM I/Q signals, and converts them into WCDMA and GSM GW uplink data respectively.

Since the transmission data of the downlink baseband high-rate signal is framed in the CPRI protocol in the downlink transmission process in the seventh embodiment, the uplink baseband high-rate signal is de-framed in the CPRI protocol in this step, and actually the data can alternatively be framed and de-framed in IR/OBSAI or other interface protocols supporting communications over an optical fiber link.

The foregoing description is merely illustrative of the preferred embodiments of the invention but not intended to limit the invention, and any modifications, equivalent substitutions, adaptations, etc., which are made without departing from the spirit and principle of the invention, shall be encompassed in the claimed scope of the invention.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A wireless communication system of a flat network architecture, comprising at least one baseband signal source, an Expansion Unit (EU) and at least one Radio remote Unit (RU) connected with the EU, wherein:

the baseband signal source, configured to convert downlink data transmitted by a radio service provider network into a downlink baseband high-rate signal and then transmit the downlink baseband high-rate signal to the EU, and to convert an uplink baseband high-rate signal transmitted by the EU into uplink data and then transmit the uplink data to the radio service provider network;

the EU, configured to decompose the downlink baseband high-rate signal transmitted by the baseband signal source into multiple downlink sub-baseband high-rate signals and convert the downlink sub-baseband high-rate signals into downlink sub-baseband low-rate signals and then transmit the downlink sub-baseband low-rate signals to the RU, and to converge and convert uplink sub-baseband low-rate signals transmitted by the RU into the uplink baseband high-rate signal and then transmit the uplink baseband high-rate signal to the baseband signal source; and the RU, configured to up-convert the downlink sub-baseband low-rate signals transmitted by the EU into remote downlink radio frequency signals and transmit the remote downlink radio frequency signals to a user equipment, and to down-convert remote uplink radio frequency signals transmitted by the user equipment into the uplink sub-baseband low-rate signals and then transmit the uplink sub-baseband low-rate signals to the EU, wherein the sub-baseband high-rate signals are I/O signals of the baseband signals.

2. The wireless communication system according to claim 1, wherein:

the baseband signal source comprises at least one of following baseband signal sources:

a baseband signal source including a Gateway (GW) sub-system and an Access Unit (AU) sub-system, a baseband signal source including a Base Transceiver Station (BTS) and a relay station, a baseband signal source including a femto base station and a relay station, and a baseband signal source including a Radio Remote Unit (RRU) and a relay station.

3. The wireless communication system according to claim 1, wherein the EU comprises:

a baseband processing unit, configured to decompose the downlink baseband high-rate signal transmitted by each baseband signal source into the multiple downlink sub-baseband high-rate signals and transmit the downlink sub-baseband high-rate signals to an output conversion unit, and to converge the uplink sub-baseband low-rate signals transmitted by the RU into an uplink baseband low-rate signal and then transmit the uplink baseband low-rate signal to the output conversion unit; and the output conversion unit, configured to convert the downlink sub-baseband high-rate signals transmitted by the baseband processing unit into the downlink sub-baseband low-rate signals and transmit the downlink sub-baseband low-rate signals to the RU, and to convert the uplink baseband low-rate signal transmitted by the baseband processing unit into the uplink baseband high-rate signal and then transmit the uplink baseband high-rate signal to the baseband signal source.

4. The wireless communication system according to claim 3, wherein:

the baseband processing unit is further configured to combine the multiple downlink sub-baseband high-rate signals into multiple sets of superimposed downlink sub-baseband high-rate signals respectively for load capacities of RUs, and to transmit the multiple sets of superimposed downlink sub-baseband high-rate signals to the output conversion unit; and the output conversion unit is particularly configured to convert the multiple sets of superimposed downlink sub-baseband high-rate signals transmitted by the baseband processing unit into multiple sets of downlink sub-baseband low-rate signals, and to transmit the multiple sets of downlink sub-baseband low-rate signals to the RUs, wherein RUs in a same cell receive a same set of downlink sub-baseband low-rate signals, and any two of RUs in different cells receive different sets of downlink sub-baseband low-rate signals.

5. The wireless communication system according to claim 1, wherein:

the baseband signal source is connected with the EU via a high-rate transmission link; and the EU is connected with the RU via a low-rate transmission link.

6. The wireless communication system according to claim 1, wherein the wireless communication system comprises multiple baseband signal sources, wherein:

the respective baseband signal sources are connected sequentially via local cascade interfaces; and any one of the baseband signal sources is particularly configured, when its adjacent succeeding baseband signal source is disconnected from the radio service provider network, to receive downlink data transmitted by the radio service provider network to the adjacent succeeding baseband signal source and transmit the downlink data to the adjacent succeeding baseband signal source via a local cascade interface, and to receive uplink data transmitted by the adjacent succeeding baseband signal source via the local cascade interface and transmit the uplink data to the radio service provider network.

7. The wireless communication system according to claim 1, wherein the wireless communication system comprises multiple baseband signal sources, wherein one of the baseband signal sources is a master baseband signal source, and the remaining baseband signal sources are subordinate baseband signal sources, and wherein:

the master baseband signal source is connected respectively with the radio service provider network and the EU, and the subordinate baseband signal sources are connected sequentially via local stacking interfaces, wherein a first subordinate baseband signal source is connected with the master baseband signal source via a stacking interface;

the master baseband signal source is configured to receive downlink data transmitted by the radio service provider network, transmit, according to the number of carriers which can be handled locally, carrier signals contained in the downlink data beyond the number of carriers to the subordinate baseband signal sources via the stacking interface, convert downlink data, which is not transmitted to the subordinate baseband signal sources, into a downlink baseband high-rate signal, receive a converted downlink baseband high-rate signal returned by the subordinate baseband signal sources and transmit the downlink baseband high-rate signals to the EU, and to receive uplink baseband high-rate signals transmitted by the EU, transmit, according to the number of carriers which can be handled locally, carrier signals contained in the uplink baseband high-rate signals beyond the number of carriers to the subordinate baseband signal sources via the stacking interface, convert uplink baseband high-rate signals, which are not transmitted to the subordinate baseband signal sources, into uplink data, receive converted uplink data returned by the subordinate baseband signal sources and transmit the uplink data to the radio service provider network; and one of the subordinate baseband signal sources is configured to receive downlink data transmitted by the master baseband signal source or a preceding subordinate baseband signal source, transmit, according to the number of carriers which can be handled locally, carrier signals contained in the downlink data beyond the number of carriers which can be handled locally to an adjacent succeeding subordinate baseband signal source via a stacking interface, convert downlink data, which is not transmitted to the succeeding subordinate baseband signal source, into a downlink baseband high-rate signal, receive converted downlink baseband high-rate signals returned by the succeeding subordinate baseband signal source and transmit the downlink baseband high-rate signals to the master baseband signal source or the preceding subordinate baseband signal source, and to receive uplink baseband high-rate signals transmitted by the master baseband signal source or the preceding subordinate baseband signal source, transmit, according to the number of carriers which can be handled locally, carrier signals contained in the uplink baseband high-rate signals beyond the number of carriers which can be handled locally to the adjacent succeeding subordinate baseband signal source via the stacking interface, convert uplink baseband high-rate signals, which are not transmitted to the succeeding subordinate baseband signal source, into uplink data, receive converted uplink data returned by the succeeding subordinate baseband signal source and transmit the uplink data to the master baseband signal source or the preceding subordinate baseband signal source.

8. An Expansion Unit (EU), comprising:
a baseband processing unit, configured to decompose a received downlink baseband high-rate signal into multiple downlink sub-baseband high-rate signals and transmit the multiple downlink sub-baseband high-rate signals to an output conversion unit, and to converge received uplink sub-baseband low-rate signals into an uplink baseband low-rate signal and then transmit the uplink baseband low-rate signal to the output conversion unit; and
the output conversion unit, configured to convert the downlink sub-baseband high-rate signals transmitted by the baseband processing unit into downlink sub-baseband low-rate signals and then output the downlink sub-baseband low-rate signals, and to convert the uplink baseband low-rate signal transmitted by the baseband processing unit into an uplink baseband high-rate signal and then output the uplink baseband high-rate signal,
wherein the sub-baseband high-rate signals are I/O signals of the baseband signals.

9. The EU according to claim 8, wherein:
the baseband processing unit is further configured to combine the multiple downlink sub-baseband high-rate signals into multiple sets of superimposed downlink sub-baseband high-rate signals respectively for load capacities of RUs receiving the downlink sub-baseband low-rate signals, and to transmit the multiple sets of superimposed downlink sub-baseband high-rate signals to the output conversion unit; and
the output conversion unit is particularly configured to convert the multiple sets of superimposed downlink sub-baseband high-rate signals transmitted by the baseband processing unit into multiple sets of downlink sub-baseband low-rate signals, and to transmit the multiple sets of downlink sub-baseband low-rate signals to the RUs, wherein RUs in a same cell receive a same set of downlink sub-baseband low-rate signals, and any two of RUs in different cells receive different sets of downlink sub-baseband low-rate signals.

10. The EU according to claim 8, wherein the EU further comprises a high-rate interface and a low-rate interface, wherein:
the high-rate interface, configured to receive the downlink baseband high-rate signal and transmit the downlink baseband high-rate signal to the baseband processing unit, and to output the uplink baseband high-rate signal converted by the output conversion unit; and
the low-rate interface, configured to receive the uplink sub-baseband low-rate signals and transmit the uplink sub-baseband low-rate signals to the baseband processing unit, and to output the downlink sub-baseband low-rate signals converted by the output conversion unit.

11. The EU according to claim 10, wherein the EU further comprises:
a clock synchronization unit, configured to perform clock synchronization between the high-rate interface and the low-rate interface.

12. A baseband signal source, comprising a reception unit, a conversion unit and a transmission unit, wherein:
the reception unit, configured to receive downlink data and to receive an uplink baseband high-rate signal transmitted by an Expansion Unit (EU), wherein the uplink baseband high-rate signal is obtained by the EU from converging and converting uplink sub-baseband low-rate signals transmitted by at least one Radio remote Unit (RU);
the conversion unit, configured to convert the downlink data received by the reception unit into a downlink baseband high-rate signal and to convert the uplink baseband high-rate signal received by the reception unit into uplink data; and
the transmission unit, configured to transmit the downlink baseband high-rate signal to the EU and the uplink data obtained by the conversion unit through conversion, wherein the downlink baseband high-rate signal is decomposed and converted into downlink sub-baseband low-rate signals and then transmitted to the RU by the EU by means of decomposing the downlink baseband high-rate signal into multiple downlink sub-baseband high-rate signals and converting the downlink sub-baseband high-rate signals,
wherein the sub-baseband high rate signals are I/O signals of the baseband signals.

13. The baseband signal source according to claim 12, wherein the baseband signal source comprises at least one of following baseband signal sources:
a baseband signal source including a Gateway (GW) sub-system and an Access Unit (AU) sub-system, a baseband signal source including a Base Transceiver Station (BTS) and a relay station, a baseband signal source including a femto base station and a relay station, and a baseband signal source including a Radio Remote Unit (RRU) and a relay station.

\* \* \* \* \*